No. 835,810. PATENTED NOV. 13, 1906.
F. C. COLLINS.
CONVEYER FOR GRAIN DRILLS.
APPLICATION FILED JUNE 9, 1905.
2 SHEETS—SHEET 1.
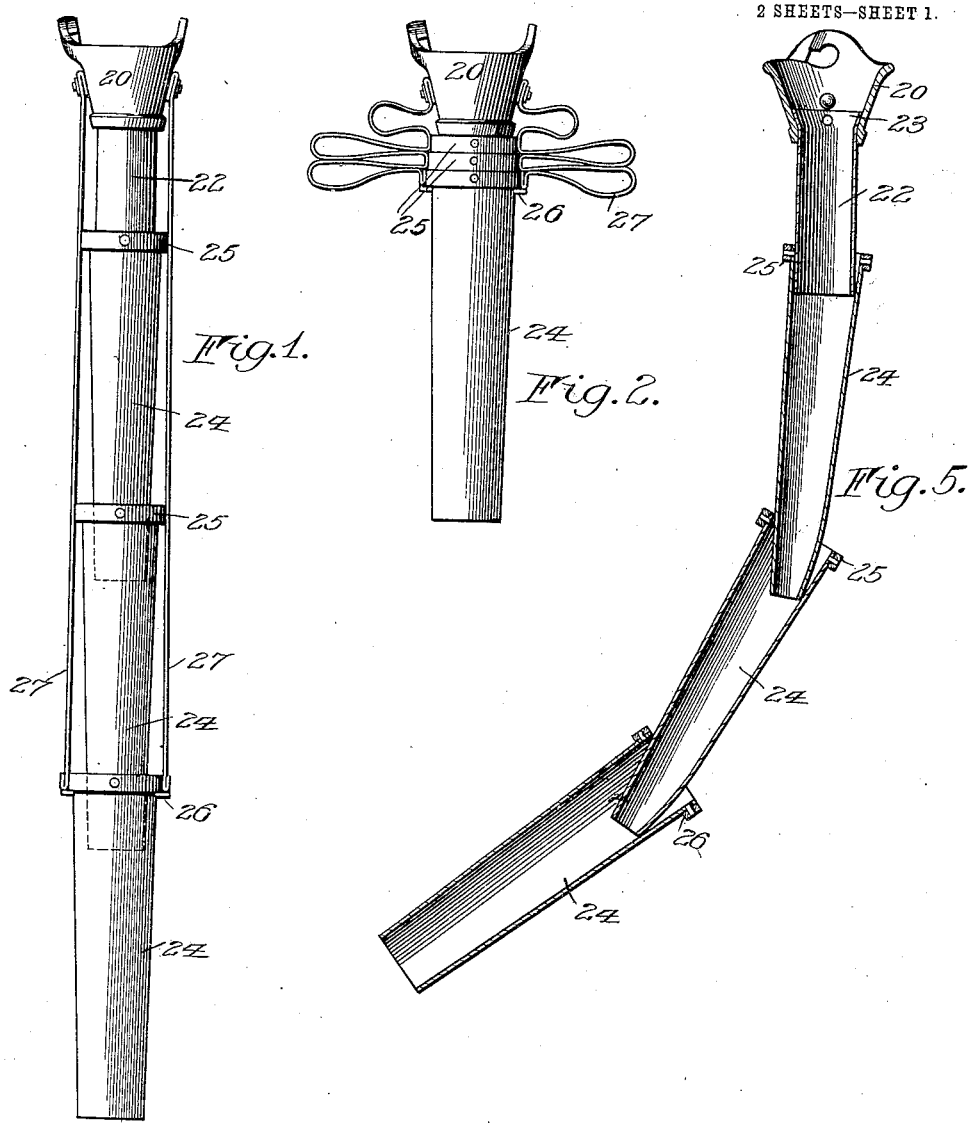

No. 835,810. PATENTED NOV. 13, 1906.
F. C. COLLINS.
CONVEYER FOR GRAIN DRILLS.
APPLICATION FILED JUNE 9, 1905.

2 SHEETS—SHEET 2.

UNITED STATES PATENT OFFICE.

FRANKLIN C. COLLINS, OF JACKSON, MICHIGAN, ASSIGNOR OF ONE-HALF TO ONTARIO DRILL COMPANY, OF DESPATCH, NEW YORK, A CORPORATION OF NEW YORK.

CONVEYER FOR GRAIN-DRILLS.

No. 835,810.  Specification of Letters Patent.  Patented Nov. 13, 1906.

Application filed June 9, 1905. Serial No. 264,397.

*To all whom it may concern:*

Be it known that I, FRANKLIN C. COLLINS, of Jackson, in the county of Jackson and State of Michigan, have invented certain new and useful Improvements in Conveyers for Grain-Drills; and I do hereby declare the following to be a full, clear, and exact description of the same, reference being had to the accompanying drawings, forming a part of the specification, and to the reference-numerals marked thereon.

My present invention relates to grain-drills or that class of machines employed for sowing or planting various kinds of grain and embodying generally tools or furrow-openers and distributing mechanism from which given quantities of seeds are conducted to the furrow.

My invention has for its object to provide an improved form of conveyer for connecting the distributing mechanism and the tools, said conveyer being capable of collapsing when the tool is adjusted vertically and will yield to permit the usual automatic movement imparted to the tool when it engages an obstruction.

To these and other ends the invention consists in certain improvements and combinations of parts, all as will be hereinafter more fully described, the novel features being pointed out in the claims at the end of the specification.

Figure 3:
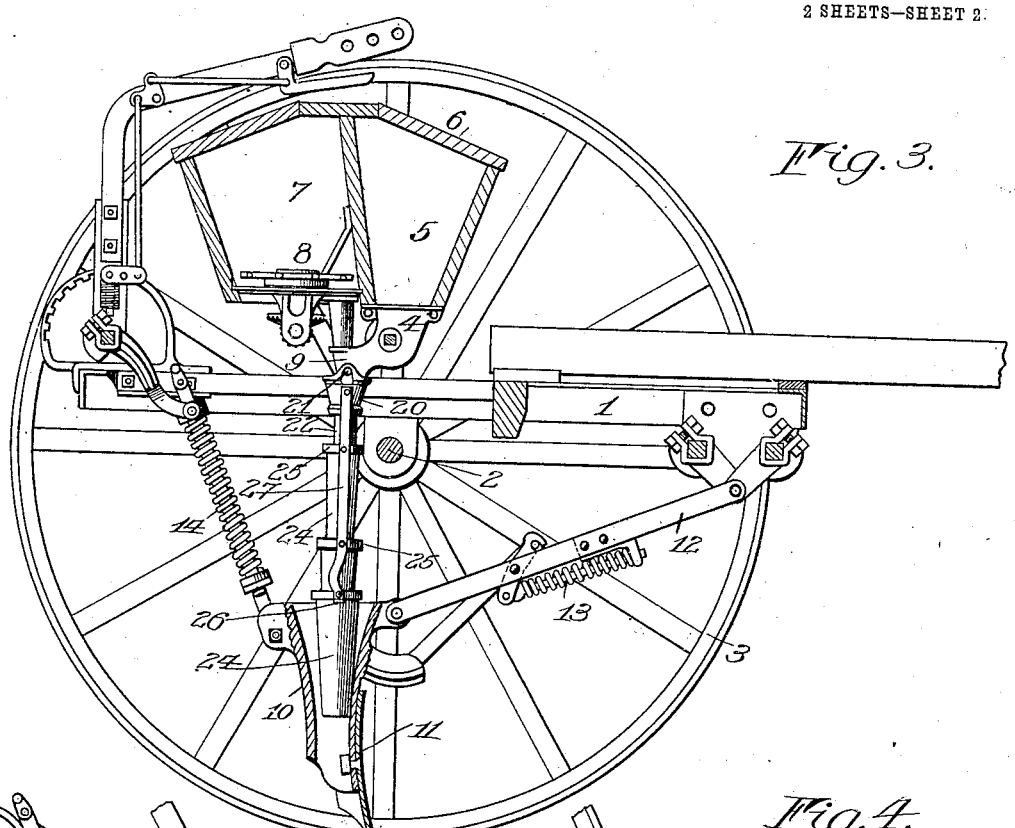
Figure 4:
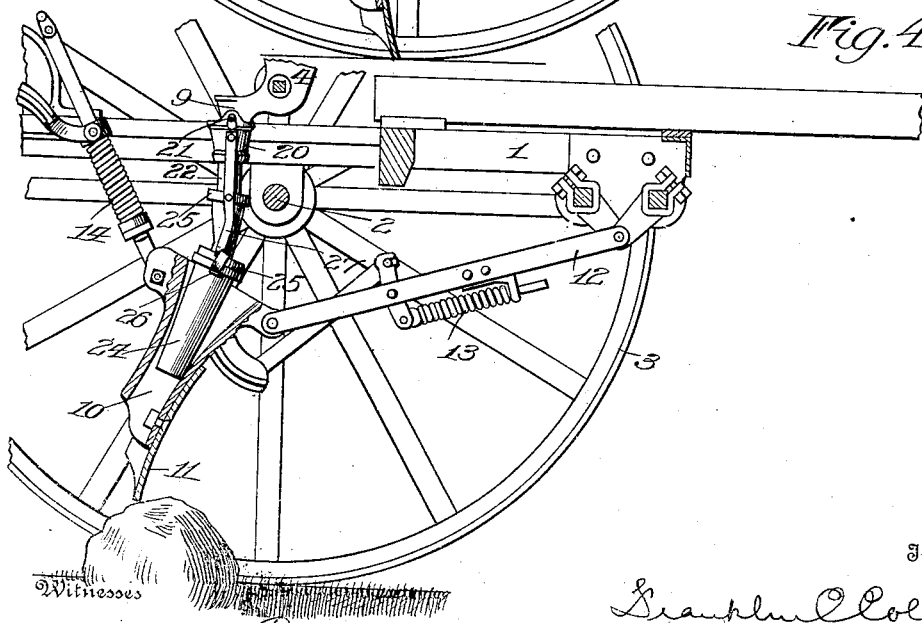

In the drawings, Figure 1 is an elevation of a conveyer constructed in accordance with my invention. Fig. 2 is a similar view thereof, showing the conveyer collapsed. Fig. 3 is a side elevation showing the device and its application to a grain-drill, the tool or furrow-opener being shown in section. Fig. 4 is a similar view illustrating its operation when the tool is operated into an unnatural position; and Fig. 5 is a sectional view of the conveyer, showing the positions the parts assume when its lower end is deflected.

Similar reference-numerals in the several figures indicate similar parts.

In grain-drills or seeding-machines employed for sowing seed in rows or furrows the seed-distributing mechanism is connected with the tools or furrow-openers by tubular conductors which are generally styled in the trade as "conveyers," and as my invention relates particularly to an improved form of these devices I have only illustrated these parts of a grain-drill with which a conveyer coöperates to show the construction of the present form of my device and the manner in which it operates.

As a type of grain-drill I have shown one in Figs. 3 and 4 embodying a frame or carriage 1, supported on the transversely-extending shaft or axle 2, carr ed at its ends in the hubs of wheels 3 and serving to drive (by intermediate connections not shown) the distributing mechanism located in a cup 4 at the bottom of a compartment 5 in a hopper 6, also containing a chamber or compartment 7, adapted to contain fertilizing material. The latter may be fed in given quantities and deposited with the seed by feeding mechanism 8, driven by the shaft 2, and for this reason the cup 4 is provided with a funnel-shaped end 9, into which both the seed and the fertilizer are deposited by the distributing and feeding mechanisms during the operation of the machine. Located substantially in alinement with the funnel 9 is the tool or furrow-opener comprising the boot 10 and the plow-point 11. The tool is pivoted at its forward side to a drag-bar 12, attached to the frame 1, and suitable devices are provided, as indicated by 13, to allow the tool to rotate rearwardly when engaging an impediment, such as a root or stump. Other devices (indicated by 14) are employed for raising the tool and supporting it out of engagement with the ground when it is not employed in the field and for holding it yieldingly depressed.

A conveyer embodying my invention comprises a head-piece 20, surrounding the lower end of the funnel 9 and detachably connected thereto by pins or lugs 21 thereon, and extending downwardly from the head is a short tubular extension 22. The latter may be formed integrally with the head, but in practice I find it preferable to construct it of a separate piece of tubing having a conical-shaped flange 23 at its upper end, which engages the corresponding inner surface of the head 20, as the tube may be pressed therein and secured either by frictionable engagement or suitable fastening devices. The remainder of the conveyer is comprised of a plurality of telescoping tubular sections 24, made of flexible material for purposes as will more fully appear hereinafter. At the upper end of each section is a stiff band or ring 25, preferably of metal, which prevents the section from collapsing and also serves, by engaging the one next above it, to raise the inclosed section when the tool is elevated. The lower section projects into the boot 10 of the tool and is supported thereon by laterally-extending projections, such as a flange 26, which rides upon the upper edge of the boot, so that the lower end of the conveyer is always in proximity to the plow-point 11, and when the tool is raised this section of the conveyer is elevated therewith and carried away from the surface of the ground to prevent the conveyer from injury by contact with obstacles and from becoming clogged with dirt or the like. The relative vertical movement of the sections on each other and on the tube 22 is limited by suitable connections 27, attached at opposite sides of the head 20 and connected to each of the rings 25 at such points that the lower end of each section is prevented from being withdrawn from the surrounding section, while the upper section is supported loosely at the end of the tube 22, as shown in Fig. 3. The connections 27 may be made of any suitable material, although I prefer to employ strips of fabric, such as webbing or tape, as this possesses the desired flexibility, is not affected by exposure to varying atmospheric conditions, and has the further advantage of not stretching, so that the opposite sides of the sections of the conveyer are supported in horizontal alinement, and the conveyer as a whole will be suspended in a vertical line beneath the head 20.

The chemical properties of fertilizing material have injurious effects upon the metal parts of machines, causing them to oxidize or rust quickly, and it is therefore desirable to construct the conveyer of some material other than metal, and in practice some form of material embodying a composition of rubber has been found to be most practical, and of such I form the telescoping sections 24, although they are made flexible to permit the conveyer to bend more or less when the tool automatically operates to disengage itself from some obstruction, as shown in Fig. 4. By making the tube flexible and of a plurality of sections it may bend if the tool is operated when in its lowermost position, or if it is elevated and operated, as in some cases occurs, when it is dragged over a stone or large projection extending some distance above the surface of the ground. During such movements of the tool the unstiffened ends of the sections projecting into the stiffened or supported upper ends of their respective surrounding sections will, under ordinary conditions, be flattened slightly, as shown in Fig. 5, permitting a considerable deflection of the lower end of the conveyer without causing the separate tubes to be kinked. However, as the sections may in some instances be partially telescoped when the tool is operated, the upper sections may bend or kink at any point throughout their length, and by providing the short metallic tube 22 this bending or kinking occurs at about the middle portion of the conveyer without causing injury thereto, as would be the case if the tube 22 was not employed and the flexible portion of the conductor extended to the head 20, as by such an arrangement all the kinking would occur at a point just below said head, causing the tube to wear out at this point.

A conveyer constructed in accordance with my invention possesses the advantage of being readily collapsed lengthwise without the disadvantage of the various sections sticking or binding together to cause the disengagement or withdrawal of the lower end of the tube from the boot of the tool, and by being constructed of flexible material the tool may be operated into any position without injury to the conveyer. The rings 25 being arranged exteriorly of the various sections form projections or abutments coöperating with each other, so that an inner section may be raised by an outer one, thus permitting them to be made cylindrical or with only a slight taper toward the lower ends, and as the connections or tapes 27 are attached to the rings they will not be sheared or cut by engagement between the sections when the latter are telescoped.

I claim—

1. A conveyer comprising a head adapted to be detachably connected to a grain-drill, a plurality of flexible telescoping tubular sections, means for supporting said sections on the head and a device on each section for preventing one of its ends from collapsing.

2. A conveyer for grain-drills comprising a head, a plurality of tubular telescoping sections of flexible material, means connecting the head and sections to limit their movement relatively thereto and suspend them with the lower end of each section extending into the upper end of the next section and means on the upper ends of the sections for preventing them from collapsing.

3. A conveyer comprising a head adapted to be detachably connected to a grain-drill, a plurality of flexible telescoping sections connected thereto and means for limiting their relative longitudinal opening and closing movement on each other.

4. A conveyer comprising a plurality of flexible telescoping sections, a head adapted to be detachably connected to a grain-drill having a tubular extension projecting into one section and means for limiting the longitudinal opening and closing movement of the sections relatively to each other and the head.

5. A conveyer comprising a head adapted to be detachably connected to a grain-drill, a plurality of telescoping flexible tubes and fabric strips connected to the head and to each section.

6. A conveyer comprising a plurality of flexible tubes fitting one within another, rigid rings for preventing the tubes from collapsing attached to their upper ends, a head fitting within the upper tube and means for limiting the relative longitudinal movement of the sections.

7. A conveyer for grain-drills comprising a head, a plurality of telescoping tubes each comprising a stiff upper end and a relatively flexible lower end, said lower end of one tube fitting said upper end of another, and means for limiting their relative longitudinal movement on each other.

8. A conveyer for grain-drills comprising a head, a plurality of flexible tubes fitting one within another, rings attached exteriorly on corresponding ends of the tubes and flexible connections between the rings and the head.

9. A conveyer comprising a head, a plurality of flexible tubes fitting one within another, rings for stiffening the tubes attached to corresponding ends thereof, a laterally-extending projection on the ring of the outer tube adapted to form a lifting projection and connections between the rings and head.

10. A conveyer comprising a tubular head adapted to be detachably connected to a grain-drill, a plurality of flexible tubular sections fitting one within another, a rigid tube fitting within the smallest section and having an end fitting within the head and means for limiting the longitudinal movement of the sections on each other and on the rigid tube.

FRANKLIN C. COLLINS.

Witnesses:
G. WILLARD RICH,
FREDERICK F. CHURCH.